United States Patent
Kang et al.

(10) Patent No.: US 11,593,625 B2
(45) Date of Patent: Feb. 28, 2023

(54) METHOD AND APPARATUS WITH NEURAL NETWORK PARAMETER QUANTIZATION

(71) Applicant: Samsung Electronics Co., Ltd., Suwon-si (KR)

(72) Inventors: Shinhaeng Kang, Suwon-si (KR); Seungwon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1087 days.

(21) Appl. No.: 16/160,444

(22) Filed: Oct. 15, 2018

(65) Prior Publication Data

US 2019/0122100 A1    Apr. 25, 2019

(30) Foreign Application Priority Data

Oct. 19, 2017    (KR) .................. 10-2017-0135868

(51) Int. Cl.
*G06N 3/063* (2006.01)
*G06F 7/499* (2006.01)
(Continued)

(52) U.S. Cl.
CPC .......... *G06N 3/063* (2013.01); *G06F 7/49957* (2013.01); *G06F 7/57* (2013.01); *G06N 3/08* (2013.01)

(58) Field of Classification Search
CPC ........ G06N 3/063; G06N 3/08; G06N 3/0454; G06N 3/0481; G06N 5/04; G06F 7/49957; G06F 7/57
See application file for complete search history.

(56) References Cited

U.S. PATENT DOCUMENTS 5,506,797 A    4/1996   Koshiba
6,144,977 A    11/2000  Giangarra et al.
(Continued)

FOREIGN PATENT DOCUMENTS

JP    7-248841 A       9/1995
JP    2012-198804 A    10/2012
(Continued)

OTHER PUBLICATIONS

Lin, D., Talathi, S., & Annapureddy, S. (Jun. 2016). Fixed point quantization of deep convolutional networks. In International conference on machine learning (pp. 2849-2858). PMLR. (Year: 2016).*

(Continued)

*Primary Examiner* — Brian M Smith
*Assistant Examiner* — Henry Trong Nguyen
(74) *Attorney, Agent, or Firm* — NSIP Law

(57) ABSTRACT

Provided is a processor implemented method that includes performing training or an inference operation with a neural network by obtaining a parameter for the neural network in a floating-point format, applying a fractional length of a fixed-point format to the parameter in the floating-point format, performing an operation with an integer arithmetic logic unit (ALU) to determine whether to round off a fixed point based on a most significant bit among bit values to be discarded after a quantization process, and performing an operation of quantizing the parameter in the floating-point format to a parameter in the fixed-point format, based on a result of the operation with the ALU.

20 Claims, 11 Drawing Sheets

FILL BITS IN FRONT OF SECOND MANTISSA VALUE WITH 0 SUCH THAT NUMBER OF BITS OF SECOND MANTISSA VALUE IS EQUAL TO NUMBER OF BITS OF FIXED-POINT FORMAT

(51) Int. Cl.
*G06F 7/57* (2006.01)
*G06N 3/08* (2006.01)

(56) References Cited

U.S. PATENT DOCUMENTS

| | | | |
|---|---|---|---|
| 10,373,050 B2* | 8/2019 | Lin | G06N 3/084 |
| 2006/0181436 A1 | 8/2006 | Moriya et al. | |
| 2009/0112334 A1 | 4/2009 | Grichnik et al. | |
| 2015/0120795 A1 | 4/2015 | Nystad et al. | |
| 2016/0092168 A1* | 3/2016 | Lutz | H03M 7/24 |
| | | | 708/204 |
| 2016/0188293 A1 | 6/2016 | Barat Quesada | |
| 2016/0328646 A1 | 11/2016 | Lin et al. | |
| 2017/0220929 A1 | 8/2017 | Rozen et al. | |

FOREIGN PATENT DOCUMENTS

| | | |
|---|---|---|
| JP | 2012-208843 A | 10/2012 |
| KR | 10-1084581 B1 | 11/2011 |
| KR | 10-1115252 B1 | 2/2012 |
| WO | WO 2016/039651 A1 | 3/2016 |

OTHER PUBLICATIONS

Kum, K. I., & Sung, W. (2001). Combined word-length optimization and high-level synthesis of digital signal processing systems. IEEE Transactions on Computer-Aided Design of Integrated Circuits and Systems, 20(8), 921-930. (Year: 2001).*

Rao, R. P., Rao, N. D., Naveen, K., & Ramya, P. (Feb. 2018). Implementation of the standard floating point MAC using IEEE 754 floating point adder. In 2018 Second International Conference on Computing Methodologies and Communication (ICCMC) (pp. 717-722). IEEE. (Year: 2018).*

Guardia, C. M., & Boemo, E. (2014, November). FPGA implementation of a binary32 floating point cube root. In 2014 IX Southern Conference on Programmable Logic (SPL) (pp. 1-6). IEEE. (Year: 2014).*

Kuo, S., et al., "Fixed-Point Considerations", *Digital Signal Processors*, 2005, pp. 1-18.

Nystrom, Johan, "Fixmath—Fixed Point Library—Summary", 2012, pp. 1-2.

Gupta, S., et al., "Deep Learning with Limited Numerical Precision", *IBM Almaden Research Center*, 2015, pp. 1-10.

Lin, D., et al., "Fixed Poit Quantization of Deep Convolutional Networks", 2016, pp. 1-10.

European Office Action dated Mar. 15, 2019 in corresponding European Patent Application No. 18201567.7 (11 pages in English).

"RealView Compilation Tools, *Libraries and Floating Point Support Guide*", 2007-2008 ARM, (Korean Language) pp. 1-204.

"RealView Compilation Tools, *Libraries and Floating Point Support Guide*", 2007-2010 ARM, (English Language) pp. 1-196.

Suzuki, Shoji, "Method of Making Floating-Point Arithmetic" Practical Design of Digital Numerical Operation Circuits, Chapter 6, First Edition, CQ Publishing Co., Ltd., Nov. 15, 2006, (21 pages in English, 15 pages in Japanese)., ISBN4-7898-3617-7.

Japanese Office Action dated Nov. 1, 2022, in counterpart Japanese Patent Application No. 2018-197320 (4 pages in English, 3 pages in Japanese).

* cited by examiner

METHOD AND APPARATUS WITH NEURAL NETWORK PARAMETER QUANTIZATION

CROSS-REFERENCE TO RELATED APPLICATION

This application claims the benefit under 35 U.S.C. § 119(a) of Korean Patent Application No. 10-2017-0135868, filed on Oct. 19, 2017, in the Korean Intellectual Property Office, the disclosure of which is incorporated herein by reference for all purposes.

BACKGROUND

1. Field

This application relates to a method and apparatus with neural network parameter quantization.

2. Description of Related Art

Recently, various processes have been implemented through processor implemented neural network models, as specialized computational architectures which, after substantial training, may provide computationally intuitive mappings between input patterns and output patterns. The trained capability of generating such mappings may be referred to as a learning capability of the neural network. Further, because of the specialized training, such specially trained neural networks may thereby have a generalization capability of generating a relatively accurate output with respect to an input pattern that the neural network may not have been trained for, for example. With recent developments of neural network technologies, various types of electronic systems have analyzed input data and have extracted effective information with a neural network.

Apparatuses that process neural networks require a large amount of operations of complex input data.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In a general aspect, a processor implemented method includes performing training or an inference operation with a neural network, by obtaining a parameter for the neural network in a floating-point format, applying a fractional length of a fixed-point format to the parameter in the floating-point format, performing an operation with an integer arithmetic logic unit (ALU) to determine whether to round off a fixed point based on a most significant bit among bit values to be discarded after a quantization process, and performing an operation of quantizing the parameter in the floating-point format to a parameter in the fixed-point format, based on a result of the operation with the ALU.

The performing of the operation with the ALU may include extracting a sign, a first exponent value, and a first mantissa value from the parameter in the floating-point format, calculating a second exponent value based on the first exponent value, the fractional length of the fixed-point format, and a bias constant that is determined based on a format of the floating-point, and calculating a second mantissa value by performing a bit manipulation operation and an integer operation with respect to the first mantissa value, based on the second exponent value.

The calculating of the second exponent value may include performing an integer operation of subtracting, from the first exponent value, the bias constant, and calculating the second exponent value by performing an integer operation of adding the fractional length to a result of the integer operation of subtracting the bias constant.

The calculating of the second mantissa value may include updating the first mantissa value by adding a bit value of 1 to a position before the first mantissa value, comparing a number of bits of the first mantissa value with a number of bits of the second mantissa value, and shifting the updated first mantissa value to the right, based on a result of the comparing of the number of bits of the first mantissa value with the number of bits of the second mantissa value.

The calculating of the second mantissa value may further include shifting the updated first mantissa value to the right by a value obtained by subtracting the second exponent value from a predetermined number determined based on a type of a floating point-format when it is determined that the second exponent value is less than the number of bits of the first mantissa value, in order to determine whether to round off the fixed point, extracting a least significant bit (LSB) value from the shifted first mantissa value, and calculating the second mantissa value by determining whether to round off the fixed point by shifting the shifted first mantissa value to the right by 1 one more time and adding the extracted LSB value, wherein the LSB value is a factor that determines whether to round off the fixed point.

The quantizing may include tuning a number of bits of the calculated second mantissa value to be equal to a number of bits of the fixed-point format, and quantizing the parameter in the floating-point format to the fixed-point format by applying the extracted sign to the tuned second mantissa value.

The calculating of the second mantissa value further include comparing the second exponent value with a value obtained by subtracting 2 from a bit width of the fixed point when it is determined that the second exponent value is equal to or greater than the number of bits of the first mantissa value, changing the format of the fixed point and then re-performing the operation when the second exponent value is greater than the value obtained by subtracting 2 from the bit width of the fixed point and, shifting the updated first mantissa value to the left by a difference between the second exponent value and the number of bits of the first mantissa value and applying the sign to the left-shifted first mantissa value to quantize the parameter in the floating-point format to the fixed-point format when the second exponent value is less than or equal to the value obtained by subtracting 2 from the bit width of the fixed point.

When the floating-point format is a single-precision floating-point format, the bias constant may be a decimal number of 127, the number of bits of the first mantissa value may be a decimal number of 23, and the predetermined number may be a decimal number of 22, and when the floating-point format is a double-precision floating-point format, the bias constant may be a decimal number of 1023, the number of bits of the first mantissa value may be a decimal number of 52, and the predetermined number may be a decimal number of 51.

The method may include converting the quantized parameter in the fixed-point format to the floating-point format based on processing conditions of a first layer of the neural network that receives the parameter in the floating-point format, from among layers of the neural network, providing the parameter in the floating-point format to the first layer, and performing the operation with the integer ALU to quantize the parameter in the floating-point format processed in the first layer back to a parameter in the fixed-point format.

In a general aspect, a neural network apparatus includes a processor configured to perform training or an inference operation with a neural network, which includes the processor being further configured to obtain a parameter for the neural network in a floating-point format apply a fractional length of a fixed-point format to the floating-point format, perform an operation with an integer arithmetic logic unit (ALU) to determine whether to round off a fixed point based on a most significant bit among bit values to be discarded after a quantization process, and quantize the parameter in the floating-point format to a parameter in the fixed-point format, based on a result of the operation with the ALU.

The processor may be further configured to extract a sign, a first exponent value, and a first mantissa value from the parameter in the floating-point format, calculate a second exponent value based on the first exponent value, the fractional length of the fixed-point format, and a bias constant that is determined based on a format of the floating-point, and calculate a second mantissa value by performing a bit manipulation operation and an integer operation with respect to the first mantissa value, based on the second exponent value.

The processor may be further configured to perform an integer operation of subtracting, from the first exponent value, the bias constant, and calculate the second exponent value by performing an integer operation of adding the fractional length to a result of the integer operation of subtracting the bias constant.

The processor may be further configured to update the first mantissa value by adding a bit value of 1 to a position before the first mantissa value, compare a number of bits of the first mantissa value with a number of bits of the second mantissa value, and shift the updated first mantissa value to the right, based on a result of the comparing of the number of bits of the first mantissa value with the number of bits of the second mantissa value.

The processor may be further configured to shift the updated first mantissa value to the right by a value obtained by subtracting the second exponent value from a predetermined number determined depending on the type of a floating point format when it is determined that the second exponent value is less than the number of bits of the first mantissa value, in order to determine whether to round off the fixed point, extract a least significant bit (LSB) value from the shifted first mantissa value, and calculate the second mantissa value by determining whether to round off the fixed point by shifting the shifted first mantissa value to the right by 1 one more time and adding the extracted LSB value, wherein the LSB value is a factor that determines whether to round off the fixed point.

The processor may be further configured to tune a number of bits of the calculated second mantissa value to be equal to a number of bits of the fixed-point format, and quantize the parameter in the floating-point format to the fixed-point format by applying the extracted sign to the tuned second mantissa value.

The processor may be further configured to compare the second exponent value with a value obtained by subtracting 2 from a bit width of the fixed point when it is determined that the second exponent value is equal to or greater than the number of bits of the first mantissa value, change the format of the fixed point and then re-perform the operation when the second exponent value is greater than the value obtained by subtracting 2 from the bit width of the fixed point and, shift the updated first mantissa value to the left by a difference between the second exponent value and the number of bits of the first mantissa value and apply the sign to the left-shifted first mantissa value to quantize the parameter in the floating-point format to the fixed-point format when the second exponent value is less than or equal to the value obtained by subtracting 2 from the bit width of the fixed point.

When the floating-point format is a single-precision floating-point format, the bias constant may be a decimal number of 127, the number of bits of the first mantissa value may be a decimal number of 23, and the predetermined number may be a decimal number of 22, and when the floating-point format is a double-precision floating-point format, the bias constant may be a decimal number of 1023, the number of bits of the first mantissa value may be a decimal number of 52, and the predetermined number may be a decimal number of 51.

The processor may be further configured to convert the quantized parameter in the fixed-point format to the floating-point format based on processing conditions of a first layer of the neural network that receives the parameter in the floating-point format, from among layers of the neural network, provide the parameter in the floating-point format to the first layer, and perform the operation with the integer ALU to quantize the parameter in the floating-point format processed in the first layer back to a parameter in the fixed-point format.

A non-transitory computer-readable recording medium having recorded thereon a computer program, which, when executed by a computer, may perform the above-noted method.

Other features and aspects will be apparent from the following detailed description, the drawings, and the claims.

Figure 1:
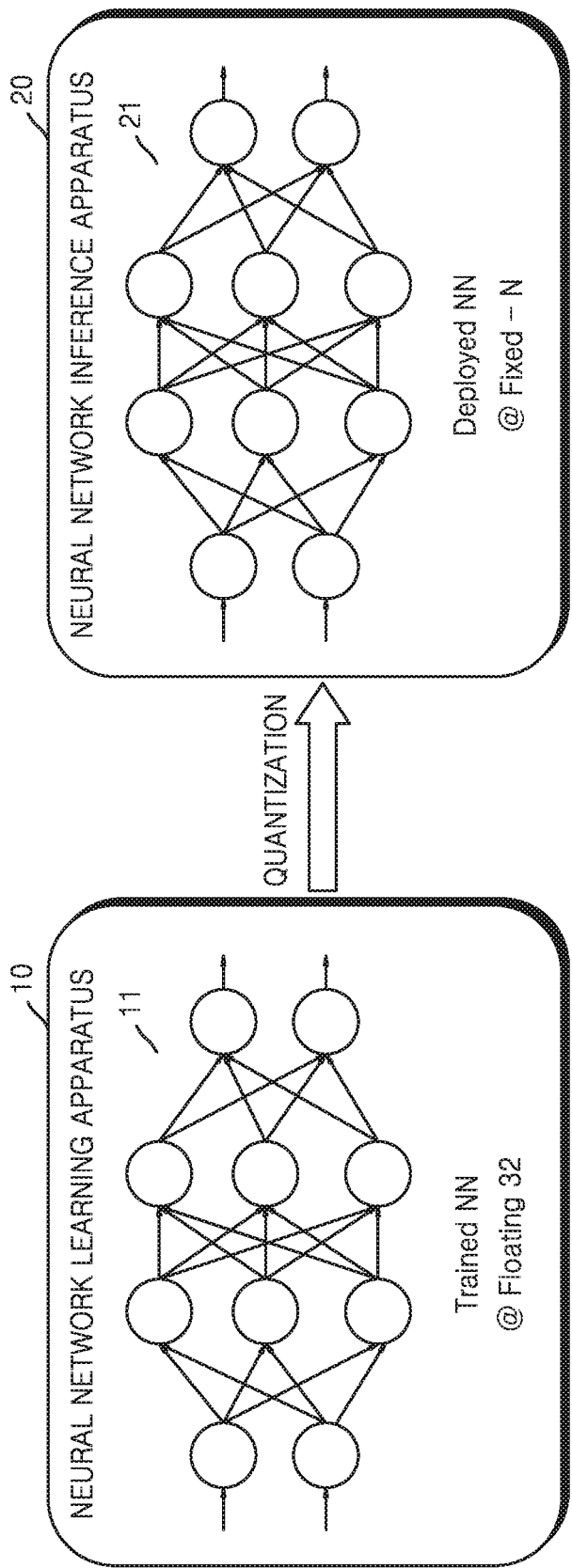
FIG. 1 illustrates an example in which a neural network quantizes a parameter in a floating-point format to a parameter in a fixed-point format.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. For example, as used herein, singular forms are intended to include plural forms as well, unless the context clearly indicates otherwise. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. As further used herein, the term "and/or" includes any and all combinations of one or more of the associated listed items. Expressions such as "at least one of," when preceding a list of elements, modify the entire list of elements and do not modify the individual elements of the list.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "coupled," or "joined" to another component, a third component may be "coupled," and "joined" between the first and second components, although the first component may be directly coupled or joined to the second component. In addition, it should be noted that if it is described in the specification that one component is "directly coupled" or "directly joined" to another component, a third component may not be present therebetween. Likewise, expressions, for example, "between" and "imme-diately between" and "adjacent to" and "immediately adjacent to" may also be construed as described in the foregoing.

FIG. 1 illustrates an example in which a neural network, according to an example, quantizes a parameter in a floating-point format to a parameter in a fixed-point format. The term "floating-point" may refer to the fact that a number's decimal point may "float" or be placed anywhere within a number relevant to the significant digits in the number. The position of the decimal point is based on an exponent, which modifies the magnitude of the number. To derive the value of the floating-point number, the significand is multiplied by the base raised to the power of the exponent. For example, in the relation "$a \times 2^b$", "a" corresponds to a significand or mantissa, "2" corresponds to the base, and "b" corresponds to an exponent.

A fixed-point format uses a string of a predetermined number of decimal digits, and the position of the decimal point in a fixed-point scheme in the string of numbers is based on a specific convention where the respective number of digits before and after the decimal point is fixed.

Referring to FIG. 1, an example of a neural network learning apparatus 10 is illustrated. The neural network learning apparatus 10 may correspond to a computing device having various processing functions, such as functions to generate a neural network, or train the neural network, quantize a floating-point format neural network to a fixed-point format neural network, and/or retrain the neural network. For example, the neural network learning apparatus 10, as well as the apparatus 20, may be implemented into, or may be representative of, various types of devices such as personal computers (PCs), server devices, mobile devices, etc.

In order to analyze in real time a large amount of input data and extract desired information by implementing a neural network, it is found herein that technology to efficiently process neural network operations may be desirable, for example, such as in devices implemented with low power and low performance.

The neural network learning apparatus 10 and the neural network inference apparatus 20 each may be respective neural network apparatuses that each include a plurality of layers, or may be different portions of a single neural network. Each of the plurality of layers may include a plurality of nodes, which may be defined and configured to perform predetermined activations of activation results from previous layers or of inputs based on the trained parameters for particular defined objectives. For example, nodes of hierarchically or laterally neighboring layers may be connected by weighted connections, as an example of the trained parameters. In addition, weighted connections may further include kernels for convolutional layers and/or recurrent connections for recurrent layers. For example, after substantial repetitive adjustments by the neural network apparatus 10 the corresponding weights of such connections are assigned to generate a trained neural network. The trained parameters may thus be stored in the memory of the neural network learning apparatus 10 or the neural network inference apparatus 20.

The plurality of layers of each of the neural networks 11 and 21 may include at least an input layer, a hidden layer, and an output layer, for example. During training, the input layer may be provided training data by the neural network learning apparatus 10, e.g., to train the neural network and assign the trained parameters, such as through a supervised training approach. During implementation of the neural network by the neural network interference apparatus 20 based on non-training data, for example, the input layer receives an input for which recognition is to be performed, such as from captured audio of a voice. Each respective input layer thus transmits the input to an example first hidden layer. The example output layer may generate an output of the corresponding neural network based on outputs from nodes of the example first hidden layer, such as in the example where there is a single hidden layer. Thus, the hidden layer representative of one or more intermediate layers disposed between the input layer and the output layer. Depending on the training or implementation example objectives, the hidden layer(s) may thus extract features from, and/or transform the training data or recognition target data received from, the input layer to values or information that can then be used to predict or estimate the training data or recognition target data in the respective training or recognition implementation operations.

Thus, for example, one or more processors of the neural network learning apparatus 10 may generate a trained neural network 11 by repeatedly training an initial or initialized neural network. To ensure accurate calculations, the initial neural network may have floating-point format parameters, for example, parameters of 32-bit floating-point precision. The parameters may include various types of data input to, or output from, the neural network, for example, input activations, output activations, weights, biases, etc. of the neural network. As the training of the neural network is repeated, the floating-point parameters of the neural network may be tuned to generate more accurate output for a given input until an accuracy threshold is reached.

The neural network learning apparatus 10 may be configured to transmit the trained neural network 11 to a hardware accelerator, such as the neural network represented by a neural network inference apparatus 20. The neural network inference apparatus 20 may be represented of or included in mobile devices, embedded devices, etc. The neural network inference apparatus 20 may be a dedicated hardware for driving a quantized neural network 21. For example, the neural network inference apparatus 20 is implemented with relatively low power or low performance, and thus, the neural network inference apparatus 20 may be implemented to be more appropriate for a fixed-point operation than a floating-point operation, since floating-point computations generally require greater processing times. The neural network inference apparatus 20 may correspond to, but is not limited to, a tensor processing unit (TPU), a neural engine, etc., which are dedicated modules for driving a neural network.

The neural network inference apparatus 20 executing or implementing the quantized neural network 21 may be implemented in a separate device that is independent of the neural network learning apparatus 10. However, the examples are not limited thereto, and the neural network inference apparatus 20 may be implemented in the same device as the neural network learning apparatus 10.

The floating-point computation may typically necessitate a relatively large number of operations, since the computation may entail a large fractional length, and relatively frequent memory accesses compared to the fixed-point computation. In particular, most of the operations that are typically performed in processing a typical neural network are multiplication and accumulation (MAC) operations. Accordingly, when the neural network inference apparatus 20 is included in devices such as smart phones, tablets, wearable devices, etc., which have a relatively low processing performance, processing of the typical neural network having floating-point format parameters may not be efficient or implementable.

In another typical floating-point to fixed-point conversion process, the output value is rounded off by discarding the entire fractional length, thus substantially reducing the accuracy of the result.

As a result, in examples, in order to implement a neural network within an allowable accuracy loss while sufficiently reducing the number of operations in the above devices, the floating-point format parameters processed in the neural network may be quantized. The parameter quantization may signify a conversion of a floating-point format parameter having high precision to a fixed-point format parameter having lower precision.

Figure 3:
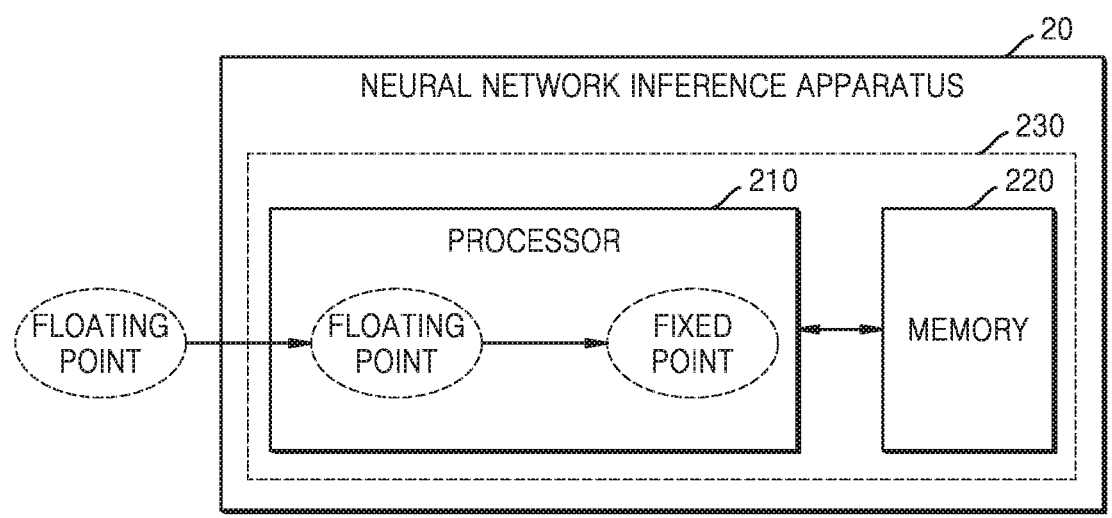
FIG. 3 is a block diagram illustrating an example of a hardware structure of a neural network inference apparatus.

A neural network quantization apparatus, e.g., such as the non-limiting example of the neural network 230 of FIG. 3, performs quantization of floating-point parameters of the trained neural network 11 to fixed-point parameters that have a predetermined number of bits. As an example, the neural network quantization apparatus may operate as a hardware accelerator that is included in one or more of the neural network learning apparatus 10 and the neural network inference apparatus 20. However, this is only an example, and the neural network quantization apparatus may operate as an independent hardware accelerator outside, or remote from the neural network learning apparatus 10 and the neural network inference apparatus 20. The neural network quantization apparatus may perform quantization of floating-point parameters of the trained neural network 11 to fixed-point parameters of a predetermined number of bits, e.g., the quantization may also be selectively implemented based on a determined status and processing of resources based on the processing performance of the example device of the neural network inference apparatus 20 that is to implement the quantized neural network 21, and the neural network quantization apparatus may transmit the quantized neural network 21 to the neural network inference apparatus 20 that is to implement the quantized neural network 21.

The performing of the training or the inference operation with the neural network may include performing the inference operation using a neural network apparatus. The neural network inference apparatus 20 that is to implement the quantized neural network 21 may be, or be included in, for example, an autonomous vehicle, a robotics, a smart phone, a tablet device, an augmented reality (AR) device, an Internet of Things (IoT) device, devices that perform voice recognition, devices that perform image recognition, etc. by implementing a neural network, but the examples are not limited thereto.

It is noted that use of the term "may" herein with respect to an example or embodiment, e.g., as to what an example or embodiment may include or implement, means that at least one example or embodiment exists where such a feature is included or implemented while all examples and embodiments are not limited thereto.

Figure 2:
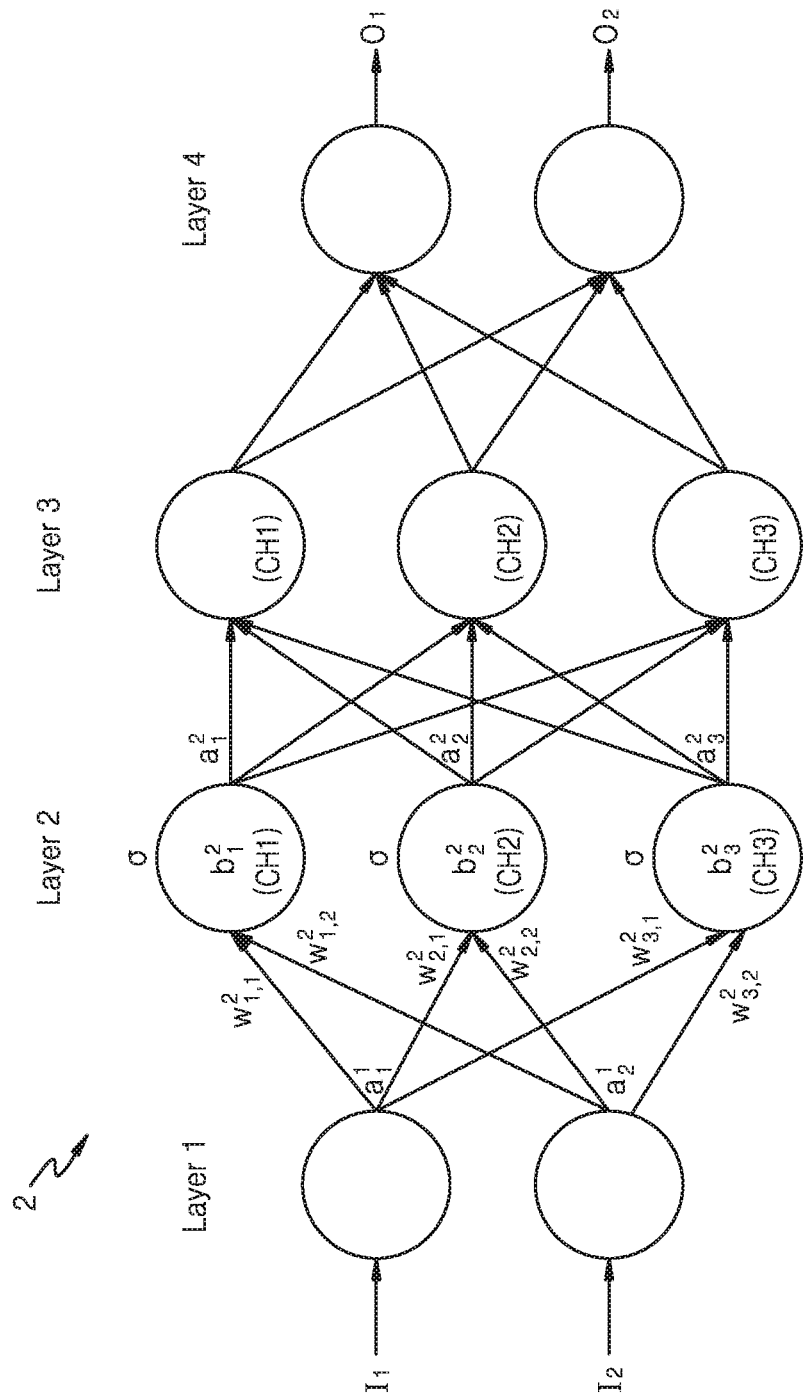
FIG. 2 illustrates an example of an operation of a neural network.

FIG. 2 illustrates an example of an operation performed in a neural network 2. The neural network 2 may correspond to the neural network 11 or the neural network 21 of FIG. 1, for example.

Referring to FIG. 2, the neural network 2 may have a structure of an input layer (Layer 1), hidden layers (Layer 2 and Layer 3), and an output layer (Layer 4). The neural network 2 may perform an operation based on received input data, for example, $I_1$ and $I_2$, and may generate output data, for example, $O_1$ and $O_2$, based on a result of the performed operation.

The neural network 2 may be, as described above, a deep neural network (DNN) or an n-layer neural network including two or more hidden layers. In the example illustrated in FIG. 2, the neural network 2 is a DNN that includes an input layer Layer 1, two hidden layers Layer 2 and Layer 3, and an output layer Layer 4. When the neural network 2 is implemented by a DNN, the neural network 2 includes multiple hidden layers for effectively processing information, which enables the neural network 2 to process more complicated data sets than a neural network having a single hidden layer. Although the neural network 2 is illustrated as including four layers, this is merely an example and the neural network 2 may include more or fewer layers, or more or fewer channels. In other words, the neural network 2 may include layers having various structures different from the structure illustrated in FIG. 2.

Each of the layers included in the neural network 2 includes a plurality of channels. The channels correspond to a plurality of artificial nodes which may also be known as artificial neurons, processing elements (PE), units, or terms similar thereto. For example, as illustrated in FIG. 2, Layer 1 includes two channels (nodes), and each of Layer 2 and Layer 3 includes three channels (nodes). However, this is merely an example, and each of the layers included in the neural network 2 may include various numbers of channels (nodes). Nodes included within and/or in neighboring hierarchical layers in the neural network 2 may be respectively connected to each other through weighted connections. The weighted connections may be trained in advance of a recognition operation, e.g., by a neural network training apparatus or before implementation by a neural network inference apparatus or a neural network quantization apparatus. The weighed connections may alternatively be results of quantization discussed herein, or weighted connections of the corresponding neural network implemented by the neural network inference apparatus. As non-limiting examples, the neural network training apparatus may correspond to the neural network training apparatus 10 of FIG. 1, the neural network inference apparatus may correspond to the neural network inference apparatus 20 of FIG. 1, and the neural network quantization apparatus may correspond to the neural network quantization apparatus 230 of FIG. 3.

The channels in the respective layers of the neural network 2 are connected to channels in other layers to process data. For example, one channel may receive data from other channels and perform various operations on the data, and may output an operation result to other channels.

The input of each of the channels may be referred to as an input activation, and the output of each of the channels may be referred to as an output activation. In other words, an activation is a parameter that is an output of one channel and is simultaneously an input of one or more channels included in the next layer. Each of the channels may determine its own activation based on the activations received from channels included in a previous layer, and, or representative weights and biases for each connection between nodes. A weight is a parameter used to calculate an output activation in each channel, and is a value allotted to a connection between the channels.

Each of the channels may be processed by a hardware computational unit or a hardware processing element that receives an input activation and outputs an output activation, and the input activation and the output activation of each of the channels may be mapped to an output feature map. If "σ" denotes an activation function, "$w_{jk}^{i}$" denotes a weight from a k-th channel included in an (i−1)th layer to a j-th channel included in an i-th layer, "$b_j^i$" denotes a bias of the j-th channel included in the i-th layer, and "$a_j^i$" denotes an activation of the j-th channel of the i-th layer, the activation "$a_j^i$" may be calculated according to Equation 1 below.

$$a_j^i = \sigma\left(\sum_k (w_{jk}^i \times a_k^{i-1}) + b_j^i\right) \quad \text{Equation 1}$$

As illustrated in FIG. 2, an output activation of a first channel (CH 1) of the second layer, Layer 2, is expressed by $a_1^2$. Furthermore, may have a value of "$a_1^2 = \sigma(w_{1,1}^2 \times a_1^1 + w_{1,2}^2 \times a_2^1 + b_1^2)$" according to Equation 1. However, the above-described Equation 1 is merely an example for describing the activation, weights, and bias that may be used to process data in the neural network 2, and the example of the neural network of FIG. 2 is not limited thereto. For example, the activation may be a value obtained by allowing a weighted sum of the activations received from the previous layer to pass through an activation function, such as a sigmoid function or a rectified linear unit (ReLU) function in examples.

In general, floating-point format parameters and fixed-point format parameters may be used as an input of layers. The floating-point format parameters and the fixed-point format parameters may also be used as the values of the weights and the bias. On the other hand, since some of the layers that constitute a neural network may need a high-precision value as an input, these layers may receive the floating-point format parameters as the input.

As described above, in the neural network 2, numerous data sets may be exchanged between a plurality of channels interconnected to each other, and the data sets may undergo numerous operations while passing through layers. The examples described herein may decrease the amount of operations needed to process complicated input data and simultaneously reduce accuracy loss present in typical approaches discussed above.

FIG. 3 is a block diagram illustrating an example of a hardware structure of the neural network inference apparatus 20.

Referring to FIG. 3, a neural network inference apparatus 20 may load from memory or receive floating-point format parameters and quantize the loaded or received floating-point format parameters to a fixed-point format, e.g., instead of receiving the quantized neural network 21 (FIG. 1) from the neural network learning apparatus 10 (FIG. 1).

The neural network inference apparatus 20 may perform an inference operation using the neural network generated by the neural network learning apparatus 10 (FIG. 1), by using the quantized fixed-point format parameters. The neural network inference apparatus 20 may convert the quantized fixed-point format parameters to floating-point format parameters, based on determined processing conditions of a certain layer.

A processor 210 may perform all functions to control the neural network inference apparatus 20. For example, the processor 210 may control all functions of the neural network inference apparatus 20, e.g., by executing one or more instructions stored in a memory 220. The processor 210 may be implemented by a central processing unit (CPU), a graphics processing unit (GPU), or an application processor (AP), etc., which are provided in the neural network inference apparatus 20. However, the processor 110 is not limited thereto.

The memory 220 is hardware configured to store various pieces of data processed in the neural network inference apparatus 20. For example, the memory 220 may store data that has been processed and data that is to be processed in the neural network inference apparatus 20. Furthermore, the memory 220 may store applications and drivers that are to be executed by the neural network inference apparatus 20. The memory 220 may be, but is not limited to, dynamic random-access memory (DRAM). The memory 220 may include at least one or both of volatile memory and non-volatile memory. Examples of the nonvolatile memory include read only memory (ROM), programmable ROM (PROM), electrically programmable ROM (EPROM), electrically erasable and programmable ROM (EEPROM), flash memory, phase-change random-access-memory (RAM) (PRAM), magnetic RAM (MRAM), resistive RAM (RRAM), ferroelectric RAM (FRAM), etc. Examples of the volatile memory include DRAM, static RAM (SRAM), synchronous DRAM (SDRAM), PRAM, MRAM, RRAM, ferroelectric RAM (FeRAM), etc. In one example, the memory 220 may include any one or any combination of two or more of a hard disk drive (HDD), a solid-state drive (SSD), a CompactFlash (CF) card, a Secure Digital (SD) card, a Micro-Secure Digital (Micro-SD) card, a Mini-Secure Digital (Mini-SD) card, an eXtreme Digital Picture (xD-Picture) card, and a Memory Stick.

The neural network inference apparatus 20 may be representative of, or included in, mobile devices such as smart phones, tablets, wearable devices, etc., or embedded devices, etc., which have a relatively low processing performance. Since the processing of floating-point parameters may necessitate a relatively large amount of operations and processing power, and relatively frequent memory accesses compared to the processing of fixed-point parameters, processing of a neural network which has floating-point format parameters may not be efficiently performed in typical neural network inference apparatuses in devices such as smart phones, wearable devices, etc. Accordingly, in this example, the processor 210 of the neural network inference apparatus 20 may quantize floating-point format parameters processed in a neural network to fixed-point format parameters.

The processor 210 may quantize the floating-point format parameters to the fixed-point format parameters by performing a bit manipulation operation and an integer operation by using an integer arithmetic logic unit (ALU), e.g. without using a special hardware structure or conversion library. According to an example, the processor 210 may quantize a 32-bit floating-point to a fixed-point of 16 or less bits. The processor 210 may be included in a neural network quantization apparatus 230 that quantizes floating-point format parameters to fixed-point format parameters. The processor 210 may also perform the internal operations, as well as other operations of the devices. The neural network quantization apparatus 230 (FIG. 3) may operate in one or more of the neural network learning apparatus 10 and the neural network inference apparatus 20, or may operate as an independent third hardware accelerator.

The processor 210 may thus obtain a floating-point format parameter in training or inferring of the neural network, and may extract a sign, a first exponent value, and a first mantissa (or significand) value from the obtained floating-point format parameter.

The processor 210 may calculate a second exponent value by using the first exponent value and a fractional length of the fixed-point format, and calculate a second mantissa value by performing a bit manipulation on the first mantissa value based on the calculated second exponent value. The processor 210 may quantize the floating-point format parameter to the fixed-point format by using a least significant bit (LSB) of the calculated second mantissa value and the extracted sign.

A process of quantizing a floating-point format parameter to a fixed-point format parameter by using the processor 210 is described below in greater detail with reference to FIG. 4.

Layers included in a neural network may have various processing conditions. According to an example, some of the layers that constitute the neural network may receive a high-precision floating-point format parameter as an input, while others of the layers may receive fixed-point parameters as an input. In the layers that receive a floating-point parameter as an input, the floating-point parameters may be quantized to fixed-point parameters. The processor 210 may convert the quantized fixed-point format parameter back to the floating-point format parameter and may then provide the floating-point format parameter as an input to respective layers. Thereafter, the processor 210 may quantize the floating-point format parameter processed in other layers back to the fixed-point format by using the above-described method in order to transmit a parameter to a next layer.

The memory 220 is hardware and may store neural network-related data sets that have been processed or data sets that are to be processed by the processor 210, for example, data of an untrained initial neural network, interim data of a neural network generated in a training process, data of a neural network for which training has been completed, data of a quantized neural network, etc. The memory 220 may also store various instructions related to training algorithms and quantization algorithms of a neural network to be executed by the processor 210. The memory 220 may also store intermediate values calculated while the processor 210 is performing bit manipulation and the integer operation by using the integer ALU. The memory 220 may be local memory and/or a main memory, for example.

Figure 4:
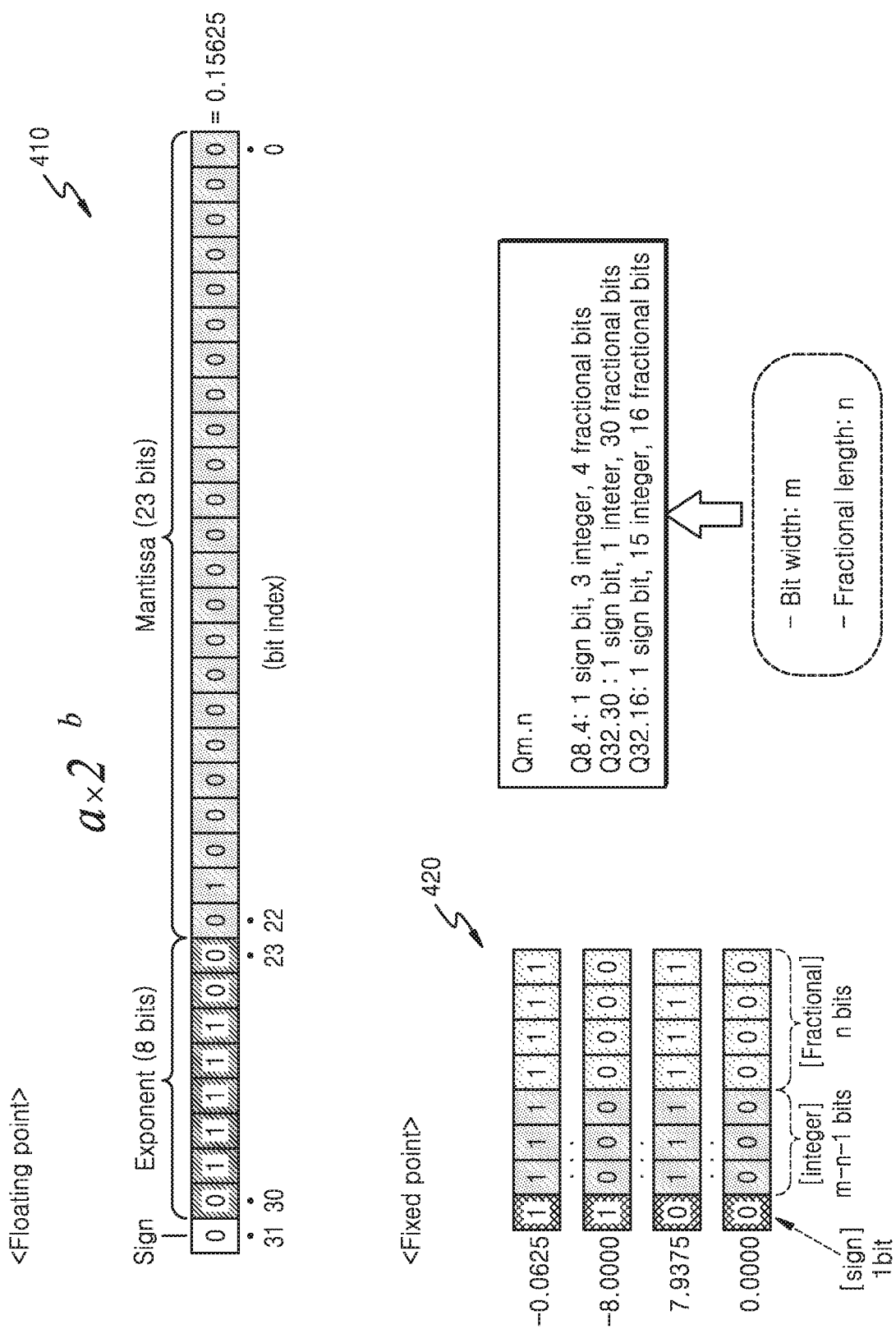
FIG. 4 illustrates an example of a floating-point value and a fixed-point value.

FIG. 4 illustrates examples of a floating-point value 410 and a fixed-point value 420.

Referring to f FIG. 4, a floating-point value 410 may be expressed as "$a \times 2^b$", in which "a" corresponds to a mantissa, "2" corresponds to a base, and "b" corresponds to an exponent. According to an example, when a floating-point format is a single-precision floating-point format, the floating-point value may be expressed by 32 bits including one sign bit, 8 exponent bits, and 23 mantissa bits.

Examples of the floating-point format include, but are not limited to, a 64-bit double-precision floating-point format, an extended single-precision floating-point format of 43 or more bits, and an extended double-precision floating-point format of 79 or more bits (generally, 80 bits), in addition to the single-precision floating-point format.

Fixed-point values 420 may be expressed by "Qm.n", where m is a natural number equal to or greater than 1 and n is a integer number equal to or greater than 0. In the expression, "Qm.n", "m" denotes a bit width and "n" denotes the number of bits indicating the numbers after a decimal point (or a fractional length). The bit width m of the fixed point is a value obtained by summing one sign bit, "m−1−n" integer bits, and n fractional bits. Since bits indicating a fractional part from among the fixed-point bits are n bits, the fractional length is n.

For example, "Q8.4" is a total 8-bit fixed-point value including one sign bit, 3 integer bits, and 4 fractional bits, "Q32.30" is a total 32-bit fixed-point value including 1 sign bit, 1 integer bit, and 30 fractional bits, and "Q32.16" is a total 32-bit fixed-point value including 1 sign bit, 15 integer bits, and 16 fractional bits.

A very small value or a very large value may be expressed when the floating-point format is used. However, a fixed-point unit (FPU) or an FPU emulation library is typically needed to perform an arithmetic operation. When the fixedpoint format is used, the range of expressible values is more limited than when the floating-point format is used, but a neural network quantization apparatus 230 (FIG. 3) may perform an arithmetic operation by using only an integer ALU.

The quantization refers to or means a conversion of a high-precision floating point real number-type parameter value to a lower-precision fixed-point integer-type parameter value.

Figure 5:
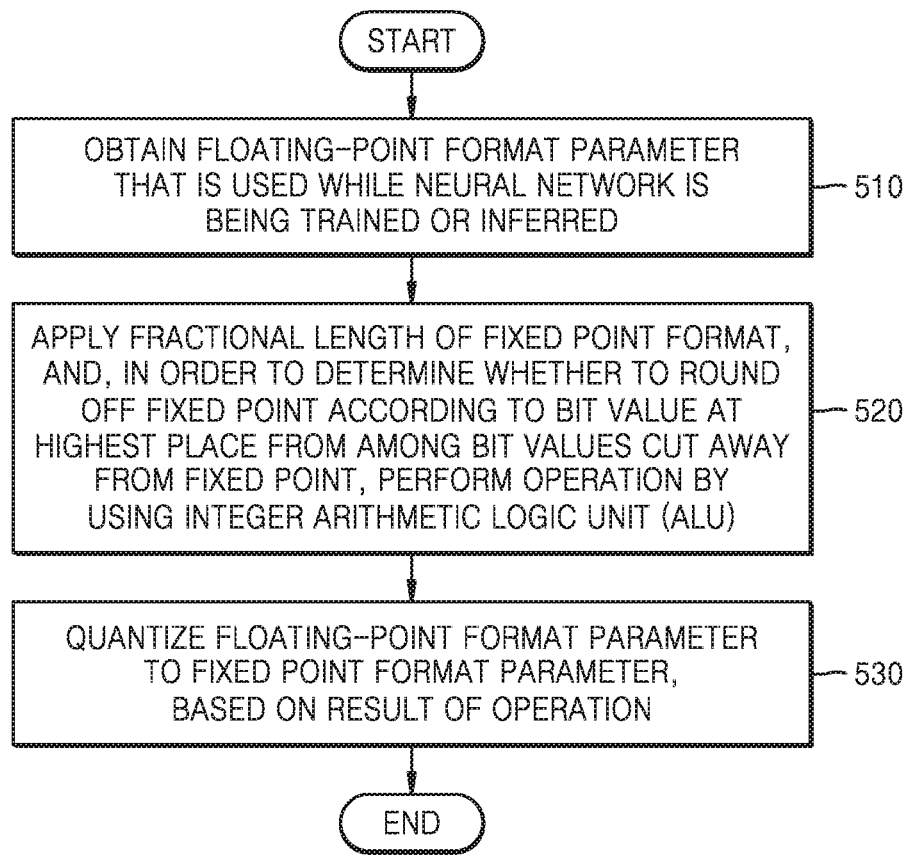
FIG. 5 is a flowchart illustrating an example of a method of quantizing parameters of a neural network.

FIG. 5 is a flowchart of an example of a method, performed by a neural network quantization apparatus, of quantizing parameters of a neural network. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions.

In addition to the description of FIG. 5 below, the descriptions of FIGS. 1-4 are also applicable to FIG. 5, and are incorporated herein by reference. Thus, the above description may not be repeated here.

The neural network quantization apparatus may operate in one or more of the neural network learning apparatus 10 and the neural network inference apparatus 20, or may operate as an independent hardware accelerator. The neural network quantization apparatus may refer to the neural network inference apparatus 230 of FIG. 3, but examples are not limited thereto.

Referring to FIG. 5, in operation 510, the neural network quantization apparatus may obtain a floating-point format parameter that is used while a neural network is being trained or inferred.

The neural network quantization apparatus may obtain the floating-point format parameter from an external device, such as a personal computer (PC) or a server, but is not limited thereto. According to an example, the parameters of the neural network may include various types of data that is input to the neural network, or data that is output from the neural network, for example, input activations, output activations, weights, biases, etc. of the neural network, e.g., neural network 11 or neural network 21 of FIG. 1, and the neural network of FIG. 2.

According to an example, the neural network quantization apparatus may obtain various formats of floating-point values according to Institute of Electrical and Electronics Engineers (IEEE) Standard 754, but is not limited thereto. For example, the neural network quantization apparatus may obtain floating-point values according to 64-bit double-precision, extended single-precision of 43 or more bits, and extended double-precision of 79 or more bits (generally, 80 bits), in addition to single-precision.

In operation 520, the neural network quantization apparatus may apply a fractional length of a fixed-point format, and, in order to determine whether to round off the fixed point according to the most significant bit among the bit values to be discarded after quantization, may perform an operation by using an integer ALU.

For example, the neural network quantization apparatus may perform a bit manipulation operation and an integer operation by using only an integer ALU without using a special hardware structure or conversion library.

According to an example, the neural network quantization apparatus may calculate a result value that is equal to the product of multiplying the floating-point value by a factor '2 to the power of (fractional length)', by performing an integer addition operation of adding the fractional length to an exponent part of the floating-point format. The neural network quantization apparatus may determine whether to round off the fixed point according to the most significant bit among the bit values to be discarded after quantization, by performing an integer addition operation and an arithmetic shift operation. The neural network quantization apparatus may minimize the accuracy loss of a quantization result while converting high precision floating-point format parameters to low precision fixed-point format parameters, by reflecting whether to round off the fixed point according to the most significant bit among the bit values to be discarded after quantization.

In operation 530, the neural network quantization apparatus may quantize the floating-point format parameter to the fixed-point format parameter, based on a result of the operation.

The neural network quantization apparatus may change (tune) the number of bits of an operation result value obtained in operation 520 to be equal to the fixed-point format. The neural network quantization apparatus may finally quantize the floating-point parameter to the fixed-point parameter by applying a sign bit of the floating point.

Instead of receiving the quantized neural network 21 from the neural network learning apparatus 10, the neural network quantization apparatus may load or receive floating-point format parameters and quantize the received floating-point format parameters to the fixed-point format to generate a neural network, or further train the neural network.

Figure 6:
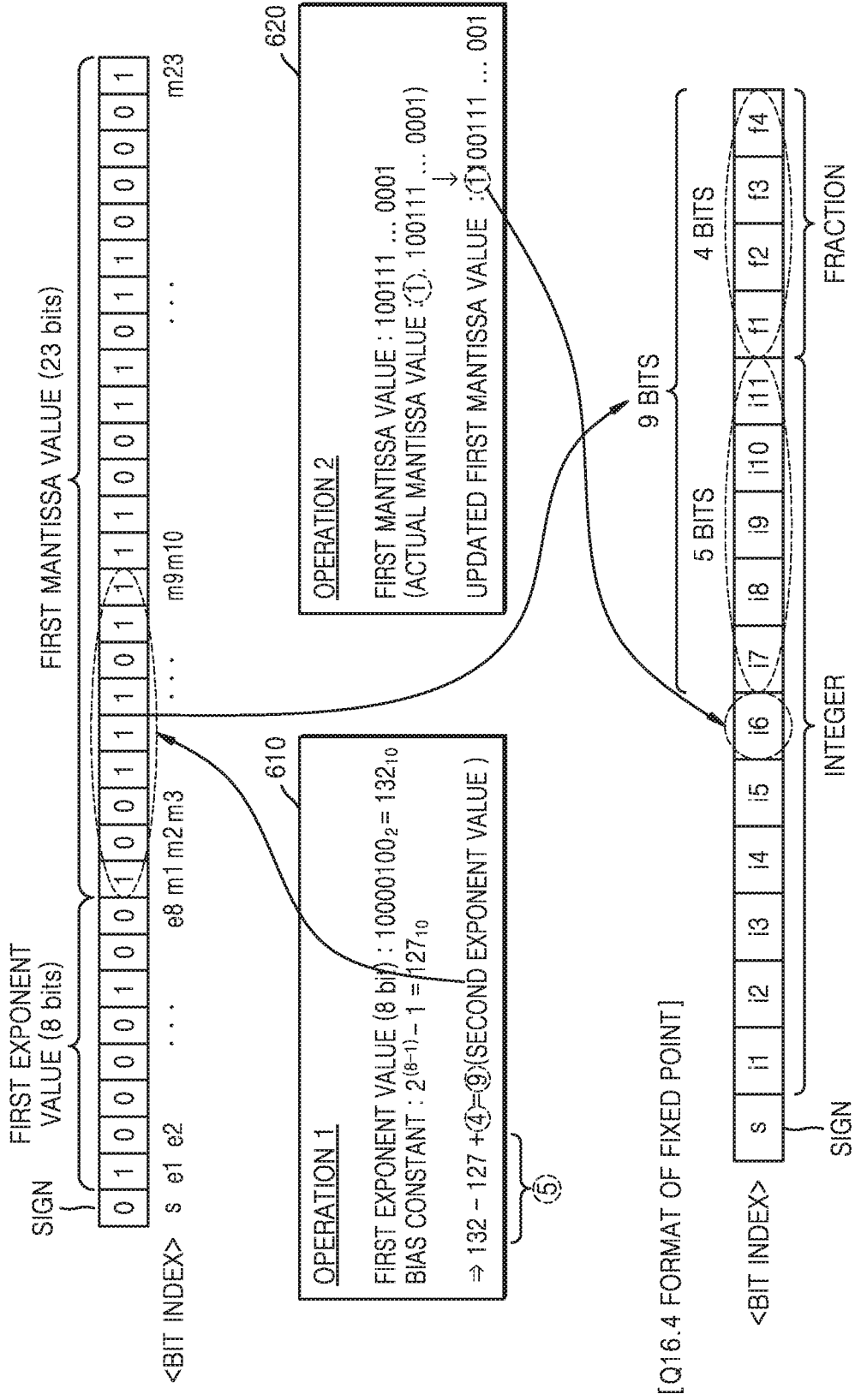
FIG. 6 is a schematic diagram illustrating an example in which a bit manipulation operation and an integer operation are performed during quantization of a floating point to a fixed point.

FIG. 6 is a schematic diagram illustrating an example in which a bit manipulation operation and an integer operation are performed during quantization of a floating-point parameter to a fixedpoint parameter, according to an example.

Referring to FIG. 6, a process of quantizing a 32-bit format floating point to a "Q16.4" format fixed point is illustrated. A sign of the 32-bit format floating point has one bit, a first exponent value has 8 bits, and a first mantissa value has 23 bits. For example, a 32-bit format floating-point value corresponding to a real number value '51.737673200562085' may be divided or separated into a sign "0", a first exponent binary value '10000100'(8 bits) and a first mantissa binary value '10011101111001101100001' (23 bits). The sign of the "Q16.4" format fixed point has one bit, an integer has 11 bits, and the fraction has 4 bits.

In FIG. 6, the sign of the floating point corresponds to a bit index s, the 8 bits of the first exponent value correspond to bit indices e1 through e8, and the 23 bits of the first mantissa value correspond to bit indices m1 through m23. The sign of the fixed point corresponds to a bit index s, the 11 bits of the integer correspond to bit indices i1 through i11, and the four bits of the fraction correspond to bit indices f1 through f4.

According to the IEEE standard, in a floating-point format, a first exponent value may be determined by adding a bias constant to an actual exponent value. Accordingly, to return the first exponent value back to the actual exponent value, the neural network quantization apparatus may subtract the bias constant from the first exponent value. The neural network quantization apparatus may arithmetically add a fractional length of the quantized fixed point to a result value obtained by subtracting the bias constant from the first exponent value in order to reflect the fractional length of the quantized fixed point.

According to an example, in operation 610, the neural network quantization apparatus may calculate the value '9' as a second exponent value by adding a fractional length '4' to a result value '5' obtained by subtracting a bias constant '127' from a first exponent value '132'. The second exponent value being '9' means that values of the 9 upper bits m1 through m9 including most significant bits (MSBs) of the first mantissa value are inserted into the 9 lower bits i7 through i11 and f1 through f4 including LSBs of the fixed point. According to whether a round off operation is performed, the neural network quantization apparatus may insert a result of adding the value of one bit to the 9 upper bits m1 through m9, into the 9 lower bits i7 through i11 and f1 through f4 of the fixed point.

According to the IEEE standard, the first mantissa value of the floating-point format is expressed by omitting 1, which is a front place value of a floating point. The neural network quantization apparatus may express the omitted value of 1 again by adding a bit value of 1 to a position in front of the first mantissa value.

Referring to operation 620, the first mantissa binary value '100111 . . . 0001' (23 bits) has an actual binary value '1.100111 . . . 0001'. The neural network quantization apparatus may update the first mantissa binary value to '1100111101111001101100001' (24 bits) by adding the bit value of 1 to a position in front of the first mantissa value. As a result of operation 610, values are inserted into the 9 lower bits i7 through i11 and f1 through f4 of the fixed point, and thus a first bit of the updated first mantissa value on the left side, namely, an MSB, is inserted into the bit i6 positioned tenth from the LSB of the fixed point.

According to operation 610 and operation 620, a determination may be made with regard to how many bits from the LSB of the fixed point (i.e., how many lower bits) are filled with the first mantissa value of the floating point.

According to another example, when the second exponent value is equal to or greater than the number of bits of the first mantissa value, the neural network quantization apparatus may compare the second exponent value with a value obtained by subtracting 2 from a bit width of the fixed point.

When it is determined that the second exponent value is greater than the value obtained by subtracting 2 from the bit width of the fixed point, the neural network quantization apparatus may change a preset fixed-point format. The neural network quantization apparatus may re-perform an operation after changing the format of the fixed point.

On the other hand, when it is determined that the second exponent value is less than or equal to the value obtained by subtracting 2 from the bit width of the fixed point, the neural network quantization apparatus may shift the updated first mantissa value to the left by a difference between the second exponent value and the number of bits of the first mantissa value. For example, when the second exponent value is 25 and the bit width of the fixed point is 26, the neural network quantization apparatus may shift the updated first mantissa value to the left by 2, which is obtained by subtracting the number of bits of the first mantissa value, 23, from the second exponent value of 25. The neural network quantization apparatus may quantize the floating-point format parameter to the fixed-point format by applying a sign to the left-shifted first mantissa value.

Figure 7:
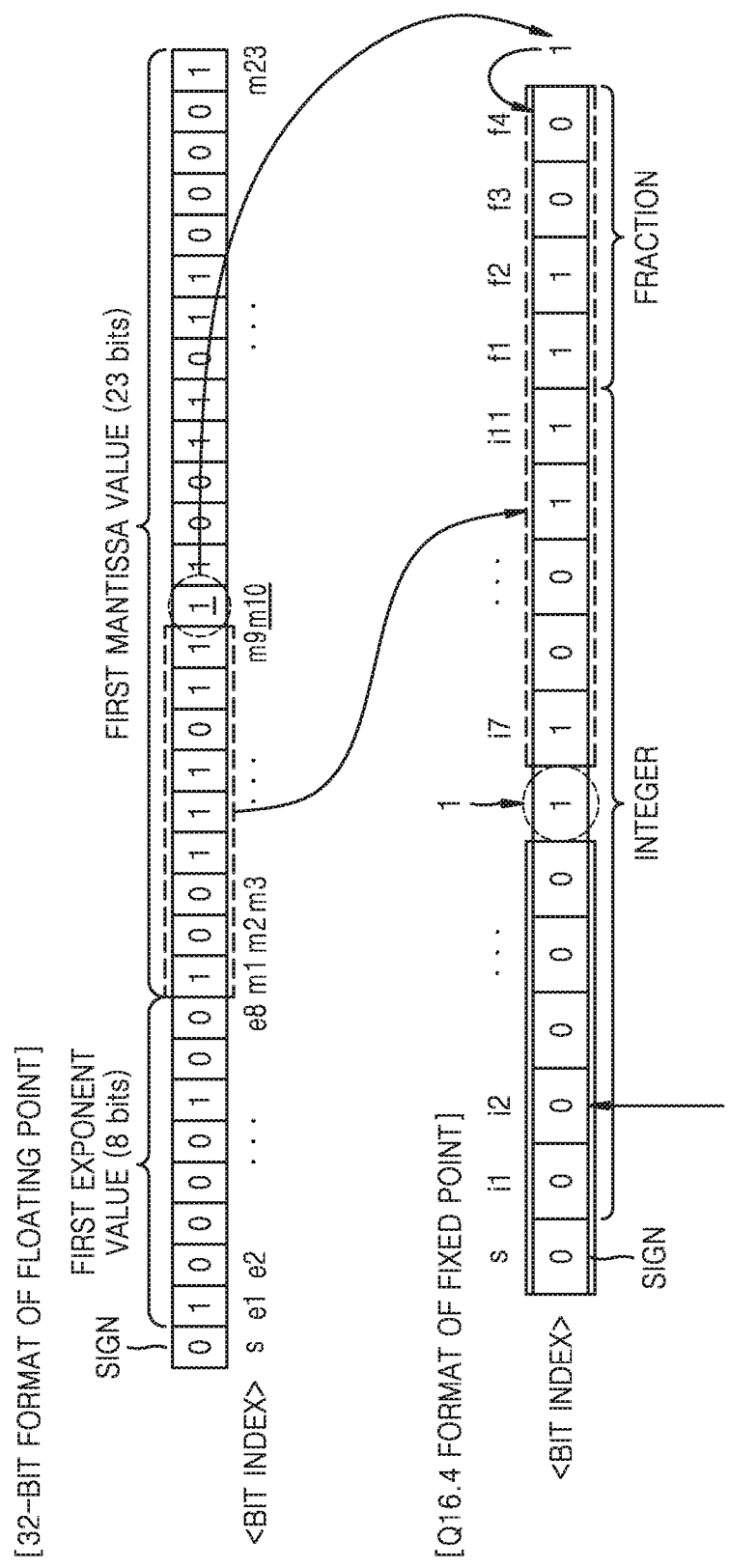
FIG. 7 is a schematic diagram illustrating an example in which a round-off and tuning of the number of bits are performed while quantizing the floating point to the fixed point.

FIG. 7 is a schematic diagram illustrating an example in which a round-off and tuning of the number of bits are performed while quantizing the floating-point parameter to the fixed-point parameter, according to an example.

The neural network quantization apparatus may minimize the accuracy loss of a quantization result (a quantized fixed-point value) by reflecting whether to round off the fixed point according to the most significant bit among the bit values to be discarded after quantization. The neural network quantization apparatus may determine whether to round off the fixed point, based on a result of operation 610 of FIG. 6. Referring to operation 610 of FIG. 6, since the second exponent value is '9' as a result of operation 610, it may be determined that a value of the bit m10 positioned tenth from the MSB of the first mantissa value is the most significant bit among the bit values to be discarded after quantization. The neural network quantization apparatus may insert the result value obtained by adding the value of the bit m10 to the 9 upper bits m1 through m9 of the first mantissa value, into the 9 lower bits i7 through i11 and f1 through f4 of the fixed point.

According to another example, the number of bits of the result value of adding the value of the bit m10 to the 9 upper bits m1 through m9 of the first mantissa value may be 10. In this case, the neural network quantization apparatus may insert a result value of 10 bits into the 10 lower bits i6 through i11 and f1 through f4 of the fixed point.

Hereinafter, a value of the 10 lower bits i6 through i11 and f1 through f4 of a fixed-point parameter in which execution of a round off or non-execution of a round off has been reflected is referred to as a second mantissa value.

The neural network quantization apparatus may be configured to fill bits in front of the second mantissa value, the number of which corresponds to a difference between the number of bits of the second mantissa value and the number of bits of the fixed-point format, with 0, such that the number of bits of the second mantissa value is equal to the number of bits of the fixed-point format. In the above example, the second mantissa value has 10 bits i6 through i11 and f1 through f4, whereas the fixed-point format is "Q16.4" and accordingly has a bit width of 16 bits, and thus there is a difference of 6 bits. Accordingly, the neural network quantization apparatus may tune the number of bits to be equal to the number of bits of the fixed-point format by filling the 6 bits before the second mantissa value with 0 ('0000001100111100' (16 bits)).

The neural network quantization apparatus may finally quantize the floating-point value to the fixed-point value by applying a sign to the second mantissa value of which the number of bits has been tuned. In the above example, as a result of applying the sign s of the floating-point value, '0', the quantized fixed-point value becomes '0000001100111100'(16 bits).

Figure 8:
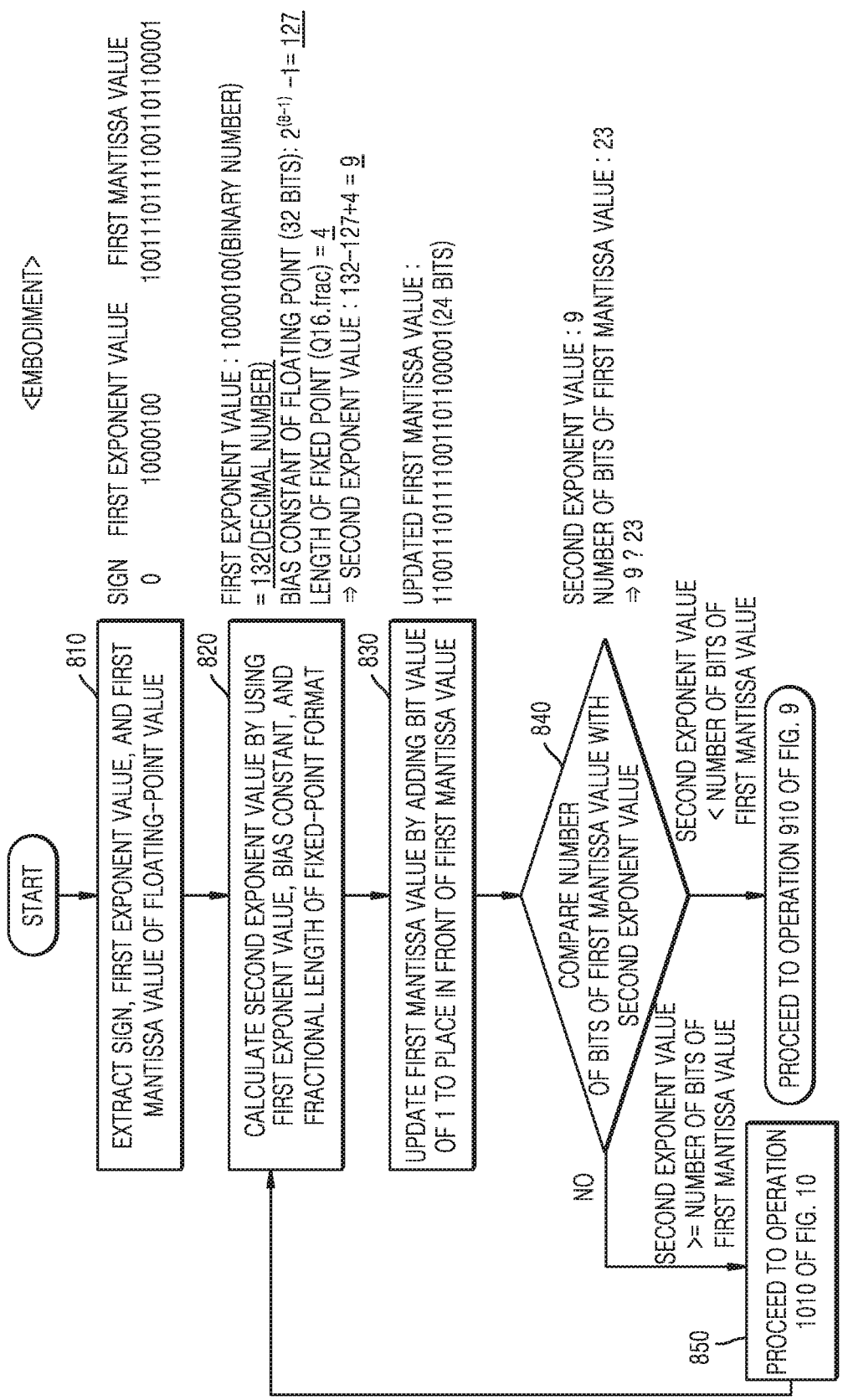
FIGS. 8-10 are flowcharts illustrating an example of a process of quantizing a floating-point real number to a fixed-point integer.
Figure 9:
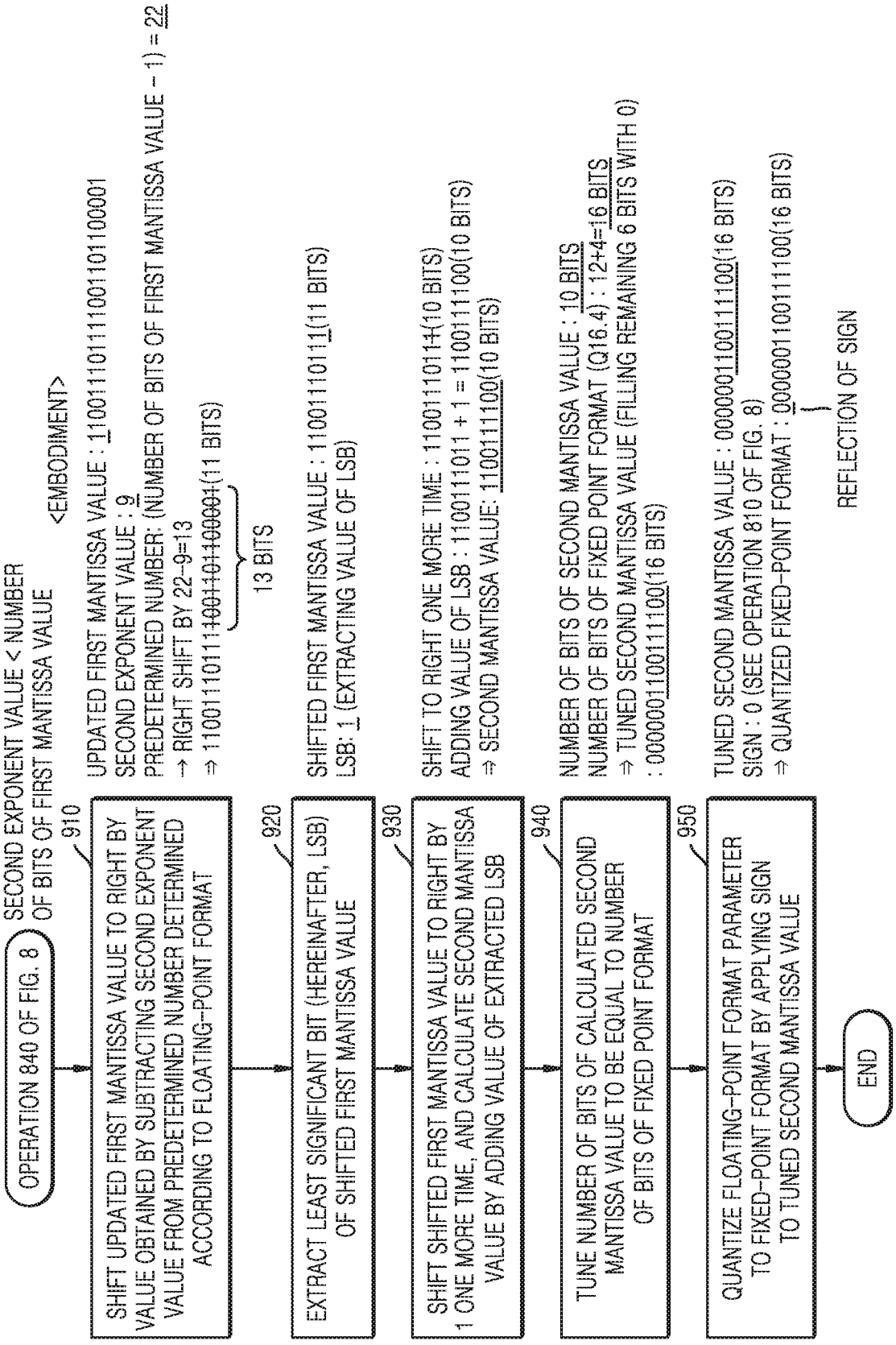
Figure 10:
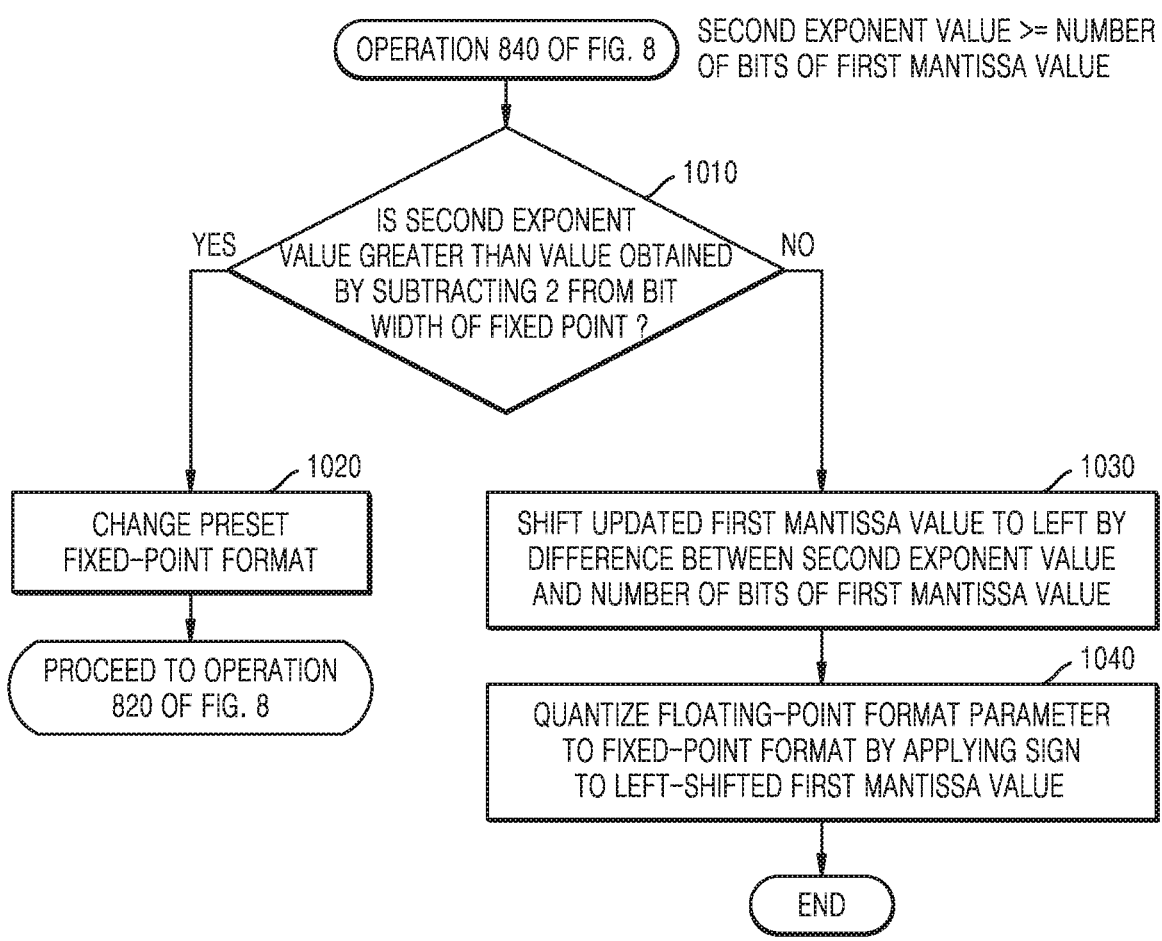

FIGS. 8-10 are flowcharts of a process of quantizing a floating-point real number to a fixed-point integer, according to an example. The operations in FIGS. 8-10 may be performed in the sequence and manner as shown, although the order of some operations may be changed or some of the operations omitted without departing from the spirit and scope of the illustrative examples described. Many of the operations shown in FIGS. 8-10 may be performed in parallel or concurrently. One or more blocks of FIGS. 8-10, and combinations of the blocks, can be implemented by special purpose hardware-based computer that perform the specified functions, or combinations of special purpose hardware and computer instructions.

In addition to the descriptions of FIGS. 8-10 below, the descriptions of FIGS. 1-7 are also applicable to FIGS. 8-10, and are incorporated herein by reference. Thus, the above description may not be repeated here.

FIGS. 8 and 9 illustrate examples of quantizing a 32-bit format floating-point value corresponding to a real value '51.737673200582085' to a 'Q16.4'-format fixed-point integer.

Referring to FIG. 8, in operation 810, the neural network quantization apparatus may extract a sign, a first exponent value, and a first mantissa value from a floating-point format parameter.

A floating point is divided into a sign, an exponent, a base, and a mantissa, and the number of bits of the exponent and the number of bits of the mantissa may vary depending on the format (for example, single precision (32 bits) or double precision (64 bits) of the floating point. The 32-bit format floating-point value has one sign bit, 8 exponent bits, and 23 mantissa bits, and the 64-bit format floating-point value has one sign bit, 11 exponent bits, and 52 mantissa bits.

For example, the 32-bit format floating-point value corresponding to the real value '51.737673200582085' is '0(sign) 10000100(exponent) 10011101111001101100001 (mantissa)'. The neural network quantization apparatus may extract '0 as a sign value, '10000100' (8 bits) as a first exponent value, and '10011101111001101100001' (23 bits) as a first mantissa value.

In operation 820, the neural network quantization apparatus may calculate a second exponent value by using the first exponent value, a bias constant, and a fractional length of the fixed-point format.

According to the IEEE standard, in the floating-point format, the first exponent value is determined by adding the bias constant to an actual exponent value. Accordingly, to return the first exponent value back to the actual exponent value, the neural network quantization apparatus may subtract the bias constant from the first exponent value. According to the standard, the bias constant is $2^{(k-1)}-1$ (where k is the number of bits of an exponent part), and k depends on the format of a floating point.

In order to reflect the fractional length of the quantized fixed point, the neural network quantization apparatus may arithmetically add the fractional length to the actual exponent value. The neural network quantization apparatus may calculate a value equal to the product of multiplying the entire floating-point value by a value '2 to the power of (fractional length)', by arithmetically adding the fractional length to a result value obtained by subtracting the bias component from the first exponent value.

In the above example, the extracted first exponent value is '10000100(binary)', and corresponds to '132(decimal)'. Since a 'Qm.n'-format fixed-point integer value (where m and n are natural numbers) is expressed as 'Q16.frac'(where frac indicates the fractional length of the fixed-point format), a fractional length in 'Q16.4' is 4. The bias constant of the floating point is $2^{(k-1)}-1$ (k is the number of bits of an exponent part), and is $2^{(8-1)}-1=127$ in the 32-bit format.

As described above, the second exponent value may be calculated by adding a fractional length to a result value obtained by subtracting the bias constant from the first exponent value. In the above example, the second exponent value is 9 (132(first exponent value)−127(bias constant)+4(fractional length)=9).

In operation 830, the neural network quantization apparatus may update the first mantissa value by adding a bit value of 1 to a position in front of the first mantissa value.

According to the IEEE standard, the first mantissa value of the floating-point format is expressed by omitting 1, which is a front position value of a floating point. The neural network quantization apparatus may express the omitted bit of 1 again by adding the bit value of 1 to the position in front of the first mantissa value. In the above example, an updated first mantissa value obtained by adding the bit value of 1 is '110011101111001101100001'(24 bits).

In operation 840, the neural network quantization apparatus may compare the number of bits of the first mantissa value with the second exponent value.

The neural network quantization apparatus may compare the number of bits of the first mantissa value with the second exponent value by determining whether a difference between the number of bits of the first mantissa value and the second exponent value is greater than or equal to 0. For example, in the case of single precision, the number of bits of the first mantissa value is 23, and the neural network quantization apparatus may compare the second exponent value '9' calculated in operation 820 with the number of bits of the first mantissa value, 23.

To determine bit values of the first mantissa value that are to be reflected in the fixed-point format, the neural network quantization apparatus may compare the second exponent value with the number of bits of the first mantissa value. The neural network quantization apparatus may reflect the determined bit values of the first mantissa value in the fixed-point format via a bit shift operation.

When it is determined in operation 840 that the second exponent value is less than the number of bits of the first mantissa value, the process proceeds to operation 910 of FIG. 9. On the other hand, when it is determined in operation 840 that the second exponent value is greater than or equal to the number of bits of the first mantissa value, the process may proceed to operation 1010 of FIG. 10.

According to an example, when the second exponent value is less than the number of bits of the first mantissa value and, as in the above example, the second exponent value is '9' and the number of bits of the first mantissa value is '23', then only the 9 upper bit values of the first mantissa value are reflected in the fixed point and the remaining 14 bit values are not reflected in the fixed point. According to another example, when the second exponent value is greater than or equal to the number of bits of the first mantissa value, then all of the bits of the second exponent value are reflected in the fixed point. However, when the second exponent value is greater than a value obtained by subtracting 2 from the bit width of the fixed point, the neural network quantization apparatus may change the format of the fixed point and then may re-perform operations starting from operation 820.

On the other hand, when the second exponent value is less than the number of bits of the first mantissa value, the neural network quantization apparatus, e.g., such as the non-limiting example of the neural network 230 of FIG. 3, may store the bit values not reflected in the fixed point in a memory, in order to use the not-reflected bit values during a process of converting the fixed point back to the floating point later.

Referring to FIG. 9, in operation 910, when it is determined in operation 840 that the second exponent value is less than the number of bits of the first mantissa value, the neural network quantization apparatus may shift the updated first mantissa value to the right by a value obtained by subtracting the second exponent value from a predetermined number that depends on the floating-point format.

The neural network quantization apparatus may minimize the accuracy loss by determining whether to round off the fixed point according to the most significant bit among the bit values to be discarded after quantization. Accordingly, in operation 910, the neural network quantization apparatus may shift the updated first mantissa value to the right by only a value obtained by subtracting the second exponent value from the predetermined number (value corresponding to the number of bits of the first mantissa value−1), instead of shifting the updated first mantissa value to the right by a value obtained by subtracting the second exponent value from the number of bits of the first mantissa value. Accordingly, the neural network quantization apparatus may determine execution or non-execution of a round-off of a fixed point by using an LSB of the first mantissa value shifted to the right by only the predetermined number.

In the above example, the number of bits of the updated first mantissa value '110011101111001101100001'(24 bits) is 24, but the predetermined number (value corresponding to the number of bits of the first mantissa value−1) is 22 and the second exponent value is 9. When the updated first mantissa value is shifted to the right by '22−9=13', a shifted first mantissa value is '11001110111' (11 bits).

In operation 920, the neural network quantization apparatus may be configured to extract the LSB of the shifted first mantissa value.

In operation 910, the neural network quantization apparatus may be configured to shift the first mantissa value to the right by only the value corresponding to 'the number of bits of the first mantissa value−1'. In this case, the LSB of the shifted first mantissa value may correspond to the most significant bit among the bit values to be discarded after quantization. The neural network quantization apparatus may be configured to extract the LSB of the shifted first mantissa value and thus use the extracted LSB to determine whether to round off the quantized fixed point. According to an example, the extracted LSB may be '1' or '0'. When the extracted LSB is '1', this corresponds to counting fractions as one. When the extracted LSB is '0', this corresponds to disregarding fractions.

In the above example, the shifted first mantissa value is '11001110111' (11 bits), and the neural network quantization apparatus may be configured to extract an LSB of the shifted first mantissa value, namely, the rightmost bit of '1'.

In operation 930, the neural network quantization apparatus may be configured to shift the shifted first mantissa value to the right by 1 an additional time, and may be configured to calculate a second mantissa value by adding the value of the extracted LSB.

By shifting the shifted first mantissa value to the right by 1 an additional time, the neural network quantization apparatus may be configured to finally shift the first mantissa value to the right by the value obtained by subtracting the second exponent value from the number of bits of the first mantissa value (23 in the case of single precision floating-point format and 52 in the case of double precision floating-point format). The neural network quantization apparatus may be configured to calculate the second mantissa value by determining whether to perform a round-off by adding the extracted LSB.

In the above example, when the shifted first mantissa value '11001110111'(11 bits) is shifted to the right one more time, '1100111011' (10 bits) is obtained, and a second mantissa value '1100111100'(10 bits) is calculated by adding the LSB of '1' extracted in operation 920.

In operation 940, the neural network quantization apparatus may be configured to tune the number of bits of the calculated second mantissa value to be equal to the number of bits of the fixed-point format.

According to an example, the neural network quantization apparatus may be configured to tune the number of bits of the second mantissa value to be equal to the number of bits of the fixed-point format, by filling bits before the second mantissa value, the number of which corresponds to a difference between the two numbers of bits, with 0.

In the above example, the bits of the second mantissa value calculated in operation 930 may be 10 bits (1100111100), and the bits of the fixed-point format 'Q16.4' may be 16 bits (12+4). The neural network quantization apparatus may be configured to tune the number of bits of the second mantissa value by obtaining 16 bits (0000001100111100) by filling 6 bits before the calculated second mantissa value with 0.

In operation 950, the neural network quantization apparatus may be configured to quantize the floating-point format parameter to the fixed-point format by applying a sign (see operation 810 of FIG. 8) to a tuned second mantissa value.

In the above example, the tuned second mantissa value of which the number of bits has been tuned is '0000001100111100' (16 bits). Referring to operation 810 of FIG. 8, because the sign is '0', a finally-quantized fixed-point format parameter is '0000001100111100'(16 bits). If the sign was '1', the finally-quantized fixed-point format parameter is '1000001100111100'(16 bits).

The neural network quantization apparatus may be configured to quantize the floating-point format parameter to the fixed-point format parameter by performing a bit manipulation operation and an integer operation by using only an integer ALU, and may generate the neural network or train or infer the neural network by using the quantized fixed-point format parameter.

Referring to FIG. 10, when it is determined in operation 840 of FIG. 8 that the second exponent value is greater than or equal to the number of bits of the first mantissa value, the neural network quantization apparatus may be configured to compare the second exponent value with a value obtained by subtracting 2 from the bit width of the fixed point, in operation 1010.

When it is determined in operation 1010 that the second exponent value is greater than the value obtained by subtracting 2 from the bit width of the fixed point, the process proceeds to operation 1020. Subtracting 2 from the bit width of the fixed point may mean reflecting a bit omitted from a mantissa value and a sign bit according to the IEEE standard.

In operation 1020, the neural network quantization apparatus, e.g., such as the non-limiting example of the neural network 230 of FIG. 3, may be configured to change a preset fixed-point format. If the second exponent value is greater than the value obtained by subtracting 2 from the bit width of the fixed point, then the second exponent value may not be suitable to quantize the floating-point parameter to the preset fixed-point parameter format, and the neural network quantization apparatus may change the format of the fixed point and may then re-perform operations starting from operation 820.

Since a length of the fixed point that may be used in the neural network may be determined, a hardware accelerator may change the format of the fixed point by maintaining the length of the fixed point but changing only a position of a point. For example, the hardware accelerator may change a point location in the fixed point, such as changing the "Q16.4" format to "Q16.3" or "Q16.5", and then re-perform operations starting from operation 820.

On the other hand, when it is determined in operation 1010 that the second exponent value is less than or equal to the value obtained by subtracting 2 from the bit width of the fixed point, the process proceeds to operation 1030.

In operation 1030, the neural network quantization apparatus may be configured to shift the updated first mantissa value to the left by the difference between the second exponent value and the number of bits of the first mantissa value. For example, when the second exponent value is 25 and the bit width of the fixed point is 26, the neural network quantization apparatus may shift the updated first mantissa value to the left by 2, which is obtained by subtracting the number of bits of the first mantissa value, 23, from the second exponent value of 25.

In operation 1040, the neural network quantization apparatus may be configured to quantize the floating-point format parameter to the fixed-point format by applying a sign to the left-shifted first mantissa value. For example, after shifting in operation 1030, two values of 0 are added to two lower bits including the LSB of the updated first mantissa value and a sign is applied, and thus the neural network quantization apparatus may quantize the floating-point format parameter to the fixed-point format.

Operations of FIGS. 8-10 may be performed simultaneously or sequentially, and may be performed in a sequence different from the sequence shown in FIGS. 8-10.

Figure 11:
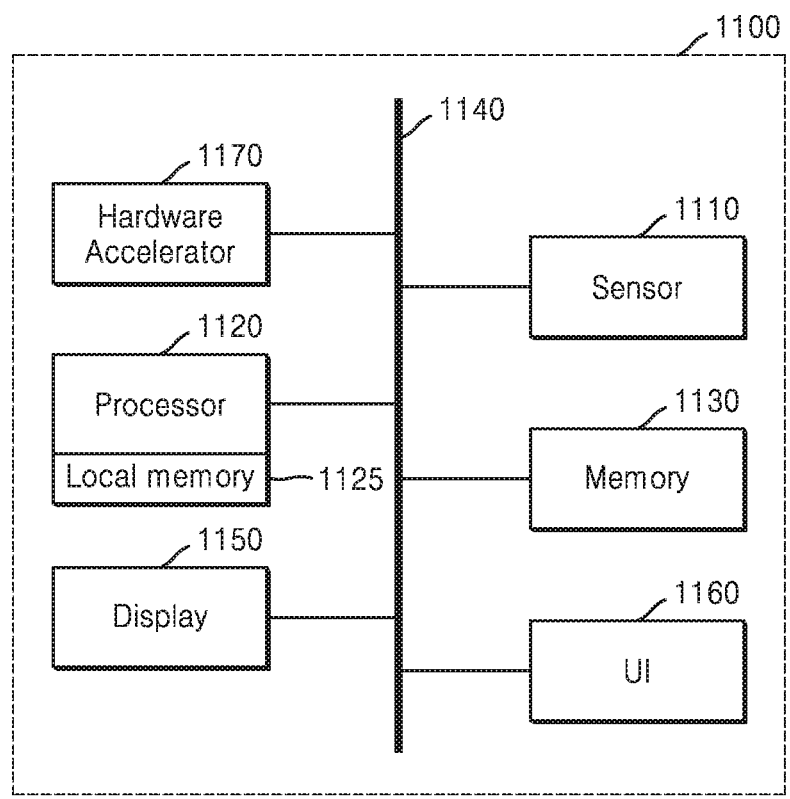
FIG. 11 is a diagram illustrating an example of an electronic system or device configured to implement a neural network.

FIG. 11 is a diagram illustrating an example of an electronic system or device configured to train and/or implement a neural network.

Referring to FIG. 11, an electronic system or device 1100 includes a sensor 1110, a processor 1120, a local memory 1125, a memory 1130, a display 1150, a user interface (UI) 1160. In an example, the electronic system or device 1100 may also include a hardware accelerator 1170. The sensor 1110, the processor, 1120, the memory 1130, the display 1150, the UI 1160, and the hardware accelerator 1170 communicate with each other via a bus 1140. Although FIG. 3 illustrates that the hardware accelerator is separate from the processor 1120, this is a non-limiting example, and the hardware accelerator 1170 may be implemented by, or may be internal to, the processor 1120. The electronic system or device 1100 may correspond to any one or more or all of the above mobile phone, camera, or personal computer neural network processing apparatuses and train and/or implement any one or more or all of the above neural network processing processes or methods. As a non-limiting example, the processor 1120 may correspond to processor 210 of FIG. 3, and the local memory 1125 may correspond to the memory 220 of FIG. 3. The memory 1130 may store a database from which floating-point parameters may be loaded from and into the local memory 1125, processed or quantized in the processor 1120 or the hardware accelerator 1170, and returned to the local memory 1125 or the memory 1130, as discussed above. In an example, the local buffers/memories may be memories of the processor 1120 or buffers/memories 1125 directly connected to the processor 1120, e.g., configured for rapidly transferring data to/from the processor 1120 and the local memory 1125, noting that alternatives are also available. The local memory 1125 may further be allocated to temporarily store output results of a particular layer of the neural network, or all layers of the neural network, the ultimate output results of which may be stored in the memory 1130 and/or respectively used for inputs to a next layer.

The sensor 1110 includes, for example, a microphone and/or an image sensor or camera to sense video data and audio data, such as when the trained neural network, or the trained objective is to recognize, reject, or verify an object, for example, or recognize or translate speech, image or object recognition, image or object verification, liveness detection, or image or object feature extraction. The sensor 1110 senses an image using a well-known scheme, for example, a scheme of converting an optical image to an electronic signal. An output of the sensor 1110 is transferred to the processor 1120 or the memory 1130, and output of the sensor 1110 may also be transferred directly to, or operate as, an input layer of any of the neural networks discussed herein.

The processor 1120 may be configured to perform the training or the inference operation with the neural network, including the obtaining of the parameter, the applying of the fractional length, the performing of the operation with the ALU, and the quantizing of the parameter.

The processor 1120 may be further configured to perform one or more or all processes described with reference to FIGS. 1 through 10. For example, to perform a recognition, rejection, or verification operation, feature extraction of an image or object, or liveness detection of the image or object, the processor 1120 may recognize, reject, or verify and/or perform feature extraction or liveness detection from the input data, or perform speech recognition and/or speech translation, based on the neural network processing operations described above with respect to FIGS. 1-10 which may also be considered acceleration processes that produce an accelerated neural network implementation. The result of any of the recognition, rejection, verification, feature extraction, and/or liveness detection operations, or speech recognition and/or translation may be output through the display 1150. In addition, user adjustments or selective operations of the neural network processing operations discussed herein may be provided by UI 1160, which may include a touch screen or other input device/system. As noted above, the processor 1120 may be a graphics processor unit (GPU), reconfigurable processor, or have any other type of multi- or single-processor configuration.

In addition to operations of one or more of the neural network processing apparatuses and/or operations described in FIGS. 1-10, as noted above, the memory 1130 may further store instructions which, when executed by processor 1120, cause the processor 1120 to perform additional operations, functions, and controls of the electronic system or device 1100, such as a user interface of the electronic system. The electronic system or device 1100 may be connected to an external device, for example, a personal computer (PC) or a network, via an input/output device of the electronic system, to exchange data with the external device. The electronic system or device 1100 may be various electronic devices, as only non-limiting examples, a mobile device, for example, a mobile telephone, a smartphone, a personal digital assistant (PDA), a tablet computer or a laptop computer, a computing device, for example, a PC, a tablet computer or a netbook computer, an electronic product, for example, a television (TV), a smart TV, or a security device for gate control.

The respective neural network inference apparatus 20, including the processor 210, and the memory 220, the network quantization apparatus 230, respective local or temporary buffer or memories, respective general or main memories or databases, or device 1100, bus 1140, processor 1120, local memory 1125, sensor 1110, memory 1130, display 1150, user interface 1160, hardware accelerator 1170, for example, and other components described herein with respect to FIGS. 1-11 and that perform the operations described in this application are implemented by hardware components. Examples of hardware components include controllers, sensors, generators, drivers, and any other electronic components configured to perform the operations described in this application. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described in this application. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components.

A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The processes and methods demonstrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method, the method comprising:
    performing training or an inference operation with a neural network, by:
        obtaining a parameter for the neural network in a floating-point format;
        applying a fractional length of a fixed-point format to the parameter in the floating-point format;

performing, by an integer arithmetic logic unit (ALU), an operation for determining whether to round off a fixed point based on a most significant bit among bit values to be discarded after a quantization process; and quantizing the parameter in the floating-point format to a parameter in the fixed-point format, based on the determination operation by the integer ALU; and generating the trained neural network or a result of the inference operation, dependent on results of the quantizing of the parameter.

2. The method of claim 1, wherein the performing of the operation with the integer ALU comprises:

extracting a sign, a first exponent value, and a first mantissa value from the parameter in the floating-point format;

calculating a second exponent value based on the first exponent value, the fractional length of the fixed-point format, and a bias constant that is determined based on a format of the floating-point; and calculating a second mantissa value by performing a bit manipulation operation and an integer operation with respect to the first mantissa value, based on the second exponent value.

3. The method of claim 2, wherein the calculating of the second exponent value comprises:

performing an integer operation of subtracting, from the first exponent value, the bias constant; and calculating the second exponent value by performing an integer operation of adding the fractional length to a result of the integer operation of subtracting the bias constant.

4. The method of claim 2, wherein the calculating of the second mantissa value comprises:

updating the first mantissa value by adding a bit value of 1 to a position before the first mantissa value;

comparing a number of bits of the first mantissa value with a number of bits of the second mantissa value; and shifting the updated first mantissa value to the right, based on a result of the comparing of the number of bits of the first mantissa value with the number of bits of the second mantissa value.

5. The method of claim 4, wherein the calculating of the second mantissa value further comprises:

shifting the updated first mantissa value to the right by a value obtained by subtracting the second exponent value from a predetermined number determined based on a type of a floating point-format when it is determined that the second exponent value is less than the number of bits of the first mantissa value, in order to determine whether to round off the fixed point;

extracting a least significant bit (LSB) value from the shifted first mantissa value; and calculating the second mantissa value by determining whether to round off the fixed point by shifting the shifted first mantissa value to the right by 1 one more time and adding the extracted LSB value, wherein the LSB value is a factor that determines whether to round off the fixed point.

6. The method of claim 5, wherein the quantizing comprises:

tuning a number of bits of the calculated second mantissa value to be equal to a number of bits of the fixed-point format; and quantizing the parameter in the floating-point format to the fixed-point format by applying the extracted sign to the tuned second mantissa value.

7. The method of claim 4, wherein the calculating of the second mantissa value further comprises:

comparing the second exponent value with a value obtained by subtracting 2 from a bit width of the fixed point when it is determined that the second exponent value is equal to or greater than the number of bits of the first mantissa value;

changing the format of the fixed point and then re-performing the operation when the second exponent value is greater than the value obtained by subtracting 2 from the bit width of the fixed point and, shifting the updated first mantissa value to the left by a difference between the second exponent value and the number of bits of the first mantissa value and applying the sign to the left-shifted first mantissa value to quantize the parameter in the floating-point format to the fixed-point format when the second exponent value is less than or equal to the value obtained by subtracting 2 from the bit width of the fixed point.

8. The method of claim 5, wherein when the floating-point format is a single-precision floating-point format, the bias constant is a decimal number of 127, the number of bits of the first mantissa value is a decimal number of 23, and the predetermined number is a decimal number of 22, and when the floating-point format is a double-precision floating-point format, the bias constant is a decimal number of 1023, the number of bits of the first mantissa value is a decimal number of 52, and the predetermined number is a decimal number of 51.

9. The method of claim 1, further comprising:

converting the quantized parameter in the fixed-point format to the floating-point format based on processing conditions of a first layer of the neural network that receives the parameter in the floating-point format, from among layers of the neural network;

providing the parameter in the floating-point format to the first layer; and performing the operation with the integer ALU to quantize the parameter in the floating-point format processed in the first layer back to a parameter in the fixed-point format.

10. A non-transitory computer-readable recording medium having recorded thereon a computer program, which, when executed by a computer, performs the method of claim 1.

11. A neural network apparatus, the apparatus comprising:

a processor configured to:

perform training or an inference operation with a neural network, which includes the processor being further configured to:

obtain a parameter for the neural network in a floating-point format;

apply a fractional length of a fixed-point format to the floating-point format;

perform, by an integer arithmetic logic unit (ALU), an operation for determining whether to round off a fixed point based on a most significant bit among bit values to be discarded after a quantization process;

quantize the parameter in the floating-point format to a parameter in the fixed-point format, based on the operation for the determining by the integer ALU; and generate the trained neural network or a result of the inference operation dependent on results of the quantizing of the parameter.

12. The neural network apparatus of claim 11, wherein the processor is further configured to:
    extract a sign, a first exponent value, and a first mantissa value from the parameter in the floating-point format;
    calculate a second exponent value based on the first exponent value, the fractional length of the fixed-point format, and a bias constant that is determined based on a format of the floating-point; and
    calculate a second mantissa value by performing a bit manipulation operation and an integer operation with respect to the first mantissa value, based on the second exponent value.

13. The neural network apparatus of claim 12, wherein the processor is further configured to:
    perform an integer operation of subtracting, from the first exponent value, the bias constant; and
    calculate the second exponent value by performing an integer operation of adding the fractional length to a result of the integer operation of subtracting the bias constant.

14. The neural network apparatus of claim 12, wherein the processor is further configured to:
    update the first mantissa value by adding a bit value of 1 to a position before the first mantissa value;
    compare a number of bits of the first mantissa value with a number of bits of the second mantissa value; and
    shift the updated first mantissa value to the right, based on a result of the comparing of the number of bits of the first mantissa value with the number of bits of the second mantissa value.

15. The neural network apparatus of claim 14, wherein the processor is further configured to:
    shift the updated first mantissa value to the right by a value obtained by subtracting the second exponent value from a predetermined number determined depending on the type of a floating-point format when it is determined that the second exponent value is less than the number of bits of the first mantissa value, in order to determine whether to round off the fixed point;
    extract a least significant bit (LSB) value from the shifted first mantissa value; and
    calculate the second mantissa value by determining whether to round off the fixed point by shifting the shifted first mantissa value to the right by 1 one more time and adding the extracted LSB value,
    wherein the LSB value is a factor that determines whether to round off the fixed point.

16. The neural network apparatus of claim 15, wherein the processor is further configured to:
    tune a number of bits of the calculated second mantissa value to be equal to a number of bits of the fixed-point format; and
    quantize the parameter in the floating-point format to the fixed-point format by applying the extracted sign to the tuned second mantissa value.

17. The neural network apparatus of claim 14, wherein the processor is further configured to:
    compare the second exponent value with a value obtained by subtracting 2 from a bit width of the fixed point when it is determined that the second exponent value is equal to or greater than the number of bits of the first mantissa value;
    change the format of the fixed point and then re-perform the operation when the second exponent value is greater than the value obtained by subtracting 2 from the bit width of the fixed point and,
    shift the updated first mantissa value to the left by a difference between the second exponent value and the number of bits of the first mantissa value and apply the sign to the left-shifted first mantissa value to quantize the parameter in the floating-point format to the fixed-point format when the second exponent value is less than or equal to the value obtained by subtracting 2 from the bit width of the fixed point.

18. The neural network apparatus of claim 15, wherein when the floating-point format is a single-precision floating-point format, the bias constant is a decimal number of 127, the number of bits of the first mantissa value is a decimal number of 23, and the predetermined number is a decimal number of 22, and when the floating-point format is a double-precision floating-point format, the bias constant is a decimal number of 1023, the number of bits of the first mantissa value is a decimal number of 52, and the predetermined number is a decimal number of 51.

19. The neural network apparatus of claim 11, wherein the processor is further configured to:
    convert the quantized parameter in the fixed-point format to the floating-point format based on processing conditions of a first layer of the neural network that receives the parameter in the floating-point format, from among layers of the neural network;
    provide the parameter in the floating-point format to the first layer; and
    perform the operation with the integer ALU to quantize the parameter in the floating-point format processed in the first layer back to a parameter in the fixed-point format.

20. The neural network apparatus of claim 11, further comprising a memory storing instruction, which when executed by the processors, configure the processor to perform the obtaining of the parameter, the applying of the fractional length to the floating-point format, the determining, and the quantizing of the parameter.

* * * * *